Dec. 17, 1957 P. C. MAYO ET AL 2,816,971
AIR BREAK SWITCHES

Filed April 5, 1956 7 Sheets-Sheet 3

INVENTORS.
Payton C. Mayo &
William L. Hollander
By: Robert H. Jendt
ATTY.

INVENTORS.
Payton C. Mayo &
William L. Hollander
By: Robert H. Wendt
Atty.

Dec. 17, 1957 P. C. MAYO ET AL 2,816,971
AIR BREAK SWITCHES
Filed April 5, 1956 7 Sheets-Sheet 7

INVENTORS
PAYTON C. MAYO &
BY WILLIAM L. HOLLANDER

Robert H. Wendt
ATTY

United States Patent Office 2,816,971
Patented Dec. 17, 1957

2,816,971

AIR BREAK SWITCHES

Payton C. Mayo and William L. Hollander, Centralia, Mo., assignors to A. B. Chance Company, Centralia, Mo., a corporation of Missouri Application April 5, 1956, Serial No. 576,307

18 Claims. (Cl. 200—48)

The present invention relates to air break switches, and is particularly concerned with air break switches of the type in which the movable switch arm has a blade that is rotatable and provided with a contact tip that is wider in one dimension so that its rotation spreads the relatively fixed contacts to assure a good contact, and in which the switch blade is also arranged to have an arcuate movement toward and away from the fixed contacts.

The present application relates to improvements in the prior application, Ser. No. 286,794, of William L. Hollander, filed May 8, 1952, on High Voltage Air Break Switch Assemblies, now Patent No. 2,745,919, May 15, 1956.

One of the objects of the invention is the provision of an improved switch of the type covered by said prior application, having a simpler structure and a more smooth action due to the discovery that the proportions of certain parts and the locations of the pivots may be so arranged that no sliding movement takes place between the two crank arms on the insulator and the rear end of the blade, which cooperate with each other in the opening or closing of the switch.

Another object of the invention is the provision of an improved air break switch construction of the class described in which no cam and follower are required to start the movement of the blade from its vertical position.

Another object of the invention is the provision of an improved air break switch assembly of the class described in which the blade is first rotated to relieve the high pressure on the jaw and blade tip contacts in the closed position; and thereafter the blade is lifted out of the jaw contacts to establish a gap between the contact end of the switch blade and the jaw of the fixed contacts; and movement is continued until the blade is substantially vertical.

Another object of the invention is the provision of an improved air break switch assembly with a simplified construction, including a lesser number of parts, having a smooth and positive action, and in which the switch is adapted to be locked in the closed position.

Another object of the invention is the provision of an improved air break switch assembly which is simpler in construction and also adapted to accomplish all of the objects of the prior application switch, on which this is an improvement.

Other objects and advantages of the invention will be apparent from the following description and the accompanying drawings, in which similar characters of reference indicate similar parts throughout the several views.

Referring to the drawings, of which there are seven sheets.

Figure 1:
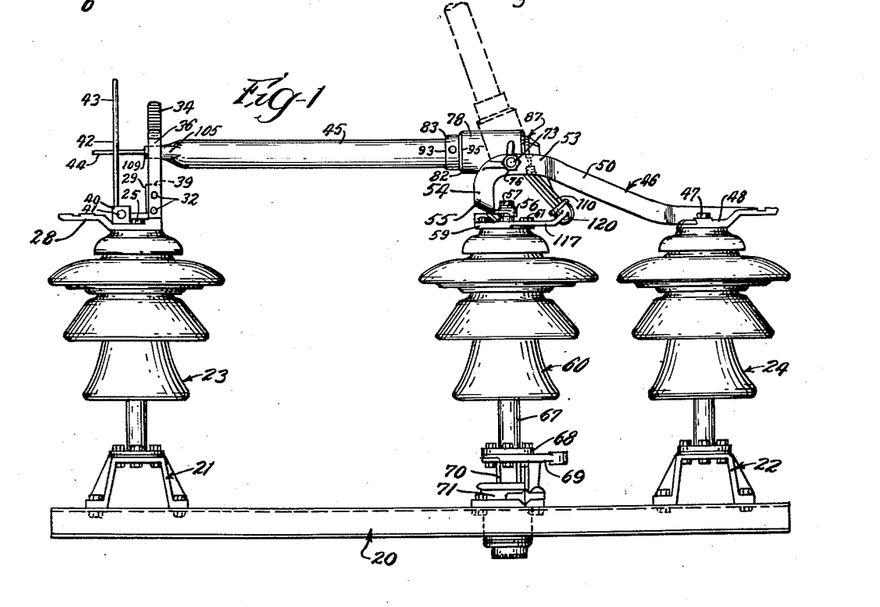
Fig. 1 is a side elevational view of an air break switch embodying the invention.
Figure 2:
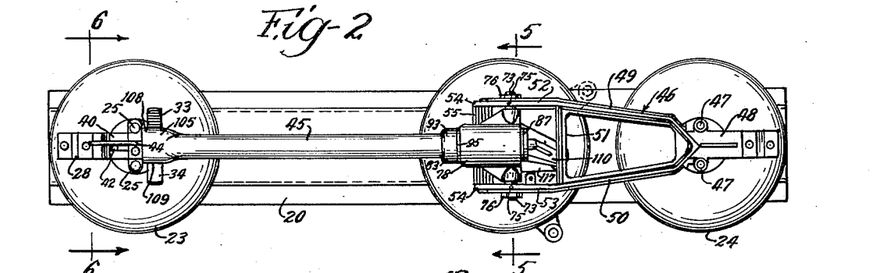
Fig. 2 is a top plan view of the switch.

Referring to Figs. 1 and 2, the air break switch assembly is preferably mounted upon a fixed support, such as a channelled member 20, which is provided with suitable bases 21, 22 for supporting the fixed insulators 23 and 24.

Figure 6:
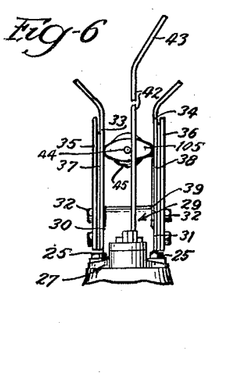
Fig. 6 is a fragmentary end elevational view, taken on the plane of the line 6—6 of Fig. 2.

The fixed insulator 23 is provided with suitable embedded threaded members for receiving the screw bolts 25 (Fig. 6) by means of which a metal contact base 27 is bolted to the top of the insulator 23; and the contact base 27 carries a laterally projecting connector arm 28 for connection to the electric circuit.

The contact base 27 has an upwardly projecting block 29 with threaded bores on its opposite sides 30, 31 for receiving the screw bolts 32 by means of which the contact jaws 33, 34 and the springs 35, 36, 37 and 38 are bolted to the block 29.

Figure 3:
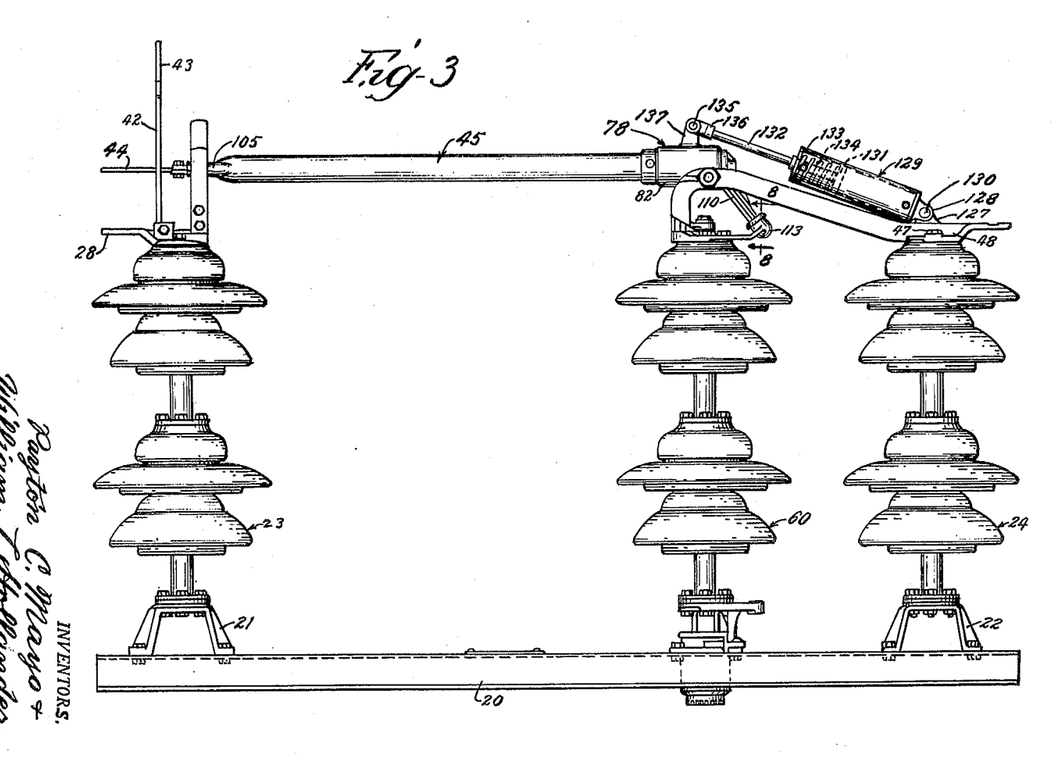
Fig. 3 is a view similar to Fig. 1 of a modification in which the switch arm is counter-balanced.

The screw bolts 32 pass through apertures in the jaws and springs; and block 29 is preferably relieved at 29 on its opposite sides near the top inside the contacts 33, 34 to permit inward movement of the jaws. The block 29 is preferably also provided with an upward extension 40 (Fig. 4) for receiving screw bolt 41, which clamps the looped end of an arc breaker contact 42, which projects forwardly from the block 29 and is provided with a diagonally extending end portion 43, which effects a break of the circuit and takes the arc in connection with the longitudinally extending wire contact 44 that is carried by the blade 45 (Fig. 3).

Contact 44 may be clamped to blade 45 with a clamp similar to that used for contact 42.

The contacts 33, 34 are made of highly conductive copper for carrying the current, while the springs 35—38 are made of suitable metal spring material not required to carry current.

The fixed insulator 24 has a bridge member 46 secured to its upper end by means of screw bolts 47 passing through a connector plate 48 to be connected to the other part of the circuit which is to be broken.

The fixed bridge 46 comprises a metal member having a frame of substantially trapezoidal shape with two spreading arms 49 and 50 integrally secured to the plate 48 and integrally secured to a transverse frame member 51. The bridge 46 has a pair of forwardly extending integral arms 52, 53, which may be substantially parallel to each other, and which are downwardly turned at 54 on each side and integrally secured to a transverse frame member 55, which carries a vertical bearing 56.

Figure 10:
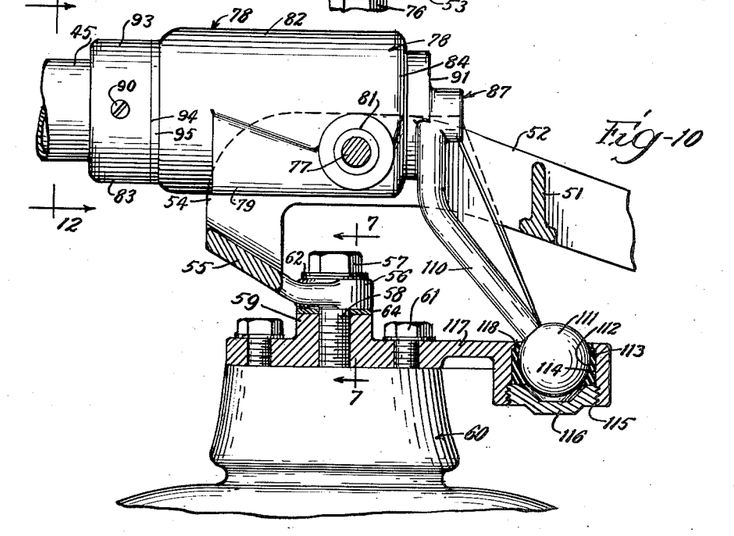
Fig. 10 is a fragmentary side elevational view of the blade actuating mechanism shown on the same scale.

Referring to Fig. 10, this is an enlarged sectional view of the structure just mentioned, showing that the bearing 56 is adapted to rotatably receive the shank of a screw bolt 57 having a threaded end 58, which is mounted in a plate 59 bolted to the top of the rotating insulator 60 by means of the through bolts 61.

Figures 7, 8:
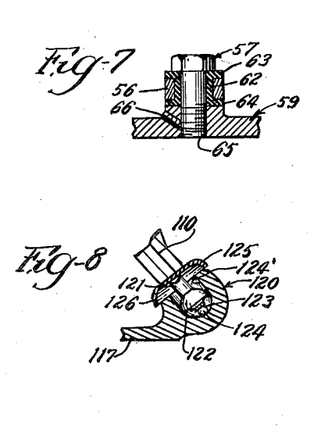
Fig. 7 is a fragmentary sectional view taken on the plane of the line 7—7 of Fig. 10.
Fig. 8 is a fragmentary sectional view, taken on a vertical plane passing through the ball and socket joint on a plane indicated by the lines 8—8 of Fig. 3.

As shown in Fig. 7, the bolt 57 supports a bearing bushing 62 in the form of a spool, having upper and lower thrust surfaces 63, 64 between which the bearing 56 may be received for permitting relative rotation between bearing 56 and screw bolt 57.

Screw bolt 57 is threaded into bore 65 and secured by means of a set screw 66 to the plate 59. Thus the fixed bridge 46 is adapted to extend from the fixed insulator 24 to the top of the rotating insulator 60, where the rotating insulator 60 provides support for the bridge 46, while permitting the rotation of this insulator. The bridge bearing 56 reduces friction between the stationary bridge 56 and rotating insulator crank 117. Bolt 57 is used as a pin between bridge bolt 56 and rotating insulator crank 117.

At its lower end the rotating insulator 60 is mounted on a vertical shaft 67 having a flange 68 for securement to a crank arm 69 by means of a plurality of screw bolts; and shaft 67 has an extension 70, which is rotatably mounted in a bearing 71 carried by the channel 20. Thus the rotating insulator 60 is rotatably mounted at its upper end in the bearing 56 of the bridge 46 and at its lower end by means of shaft extension 70, which rotates in bearing 71.

The crank arm 69 is connected to suitable actuating mechanism for one or a plurality of the air break switches in the manner described in the above-mentioned Hollander application, which is hereby incorporated by reference thereto.

Figure 5:
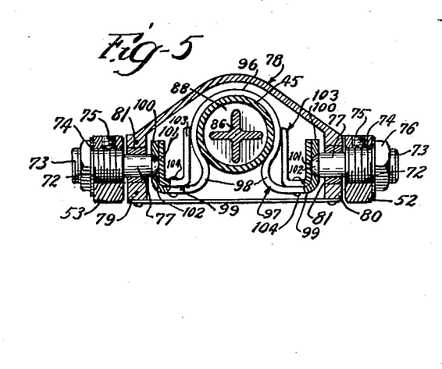
Fig. 5 is a fragmentary sectional view, taken on the plane of the line 5—5 of Fig. 2, looking in the direction of the arrows.

The parallel arms 52, 53 of bridge 46 are shown in section in Fig. 5; and they are provided with threaded bores 72, 72 for receiving the switch trunnions 73, 73, which are identical in construction and provided with a threaded portion 74, 74 threaded into the bores 72 and secured by set screws 75.

Each trunnion is locked in place by a lock nut 76 driven home against the surfaces of arms 52, 53 to assure the adjustment of each trunnion. Each trunnion has an oppositely projecting cylindrical portion 77 for pivotally supporting the blade housing 78, which has a pair of parallel bearing flanges 79, 80 provided with aligned apertures and bearings 81, 81 rotatably mounted on the cylindrical portions 77.

The blade housing 78 has a laterally projecting blade supporting tubular portion 82 with a blade bearing 83 mounted therein for rotatably supporting the blade 45, comprising a tubular cylindrical copper member.

At its opposite end the blade housing 78 has a second bearing 84 rotatably supporting the blade 45; and blade 45 has a cylindrical bore 85 for fixedly receiving the shank 86 of a blade crank member 87 having two spaced cylindrical portions 88, 89 on its shank 86 fitting in the bore 85 of blade 45 and fixedly secured thereto by set screws 90.

Crank member 87 has a radially extending flange 91 provided with an annular thrust surface 92 engaging the end of the blade housing 78; and the blade 45 supports a thrust collar 93 at the opposite end of the blade housing 78, having a thrust surface 94 and a bearing washer 95 engaging the opposite end of the blade housing 78 (Fig. 10).

Thus the blade 45 is mounted for rotation about its own axis in the blade housing 78; and the blade housing 78 is mounted for pivotal movement on a horizontal axis, which is the axis of the trunnions 73 (Fig. 5).

In order to provide an electrical connection between the blade 45 and the bridge 46, that portion of the blade 45 which is inside the blade housing 78 is partially surrounded by the partially cylindrical portion 96 of a shunt member 97, which tightly engages the blade 45, but permits relative rotation of the blade in the partially cylindrical portion 96 of the shunt.

The shunt comprises a strip of spring metal, such as resilient copper; and it is bent outwardly at 98 and provided with a U-shaped portion 99, 99 at each side, having an upwardly extending leg 100 at each side, with a frusto-conical bore 101 for engaging the frusto-conical end 102 of each trunnion.

The shunt 97 carries the current to the trunnions 73 from the blade 45; and as the heating effect of the current might affect the resilient characteristics of the shunt 97, a pair of U-shaped springs 103 are fixedly secured by means of a rivet 104 passing through the yoke of each spring so that the legs of the spring members 103 spread outwardly against the shunt portion 100 and the cylindrical portion 96 on each side, holding the frusto-conical bore 101 tightly on the complementary end of each trunnion, and also holding the cylindrical portion 96 in tight engagement with the blade 45.

At its free end, the blade 45 is deformed from the cylindrical shape to the wider elliptical end portion 105 containing a complementary block 106 of copper, which is provided with a threaded bore 107 for receiving the arc-breaking wire 44.

Figure 15:
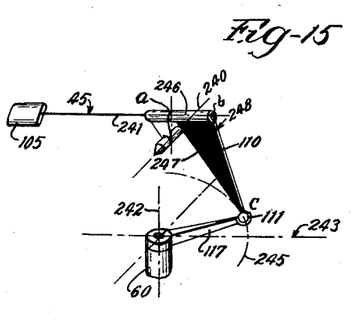
Fig. 15 is a similar diagrammatic sketch showing the position which the parts assume after the first rotating movement of the insulator, which turns the blade end to relieve contact pressure.

The elliptical portion 105 of the blade has curved edge portions 108, 109, which are farther apart than the spacing between the jaw contacts 33, 34 so that the blade may enter between the jaws 33, 34 when its wider end portion 105 is disposed diagonally, as shown in the diagram of Fig. 15; but when the blade is turned with its wider portion 105 toward a horizontal position, the blade end 105 forces the jaws 33, 34 apart and effects a tight electrical contact with them.

Figures 11, 13:
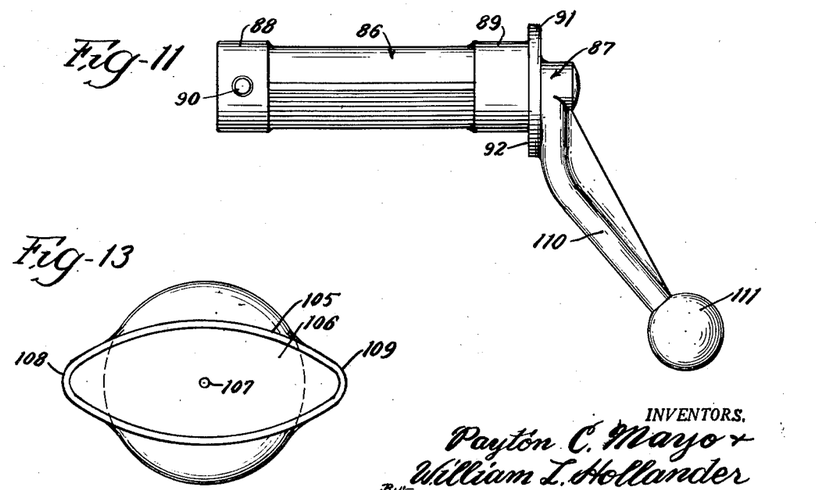
Fig. 11 is a side elevational view of the blade crank.
Fig. 13 is an end elevational view of the blade contact taken from the left of Fig. 1.
Figure 12:
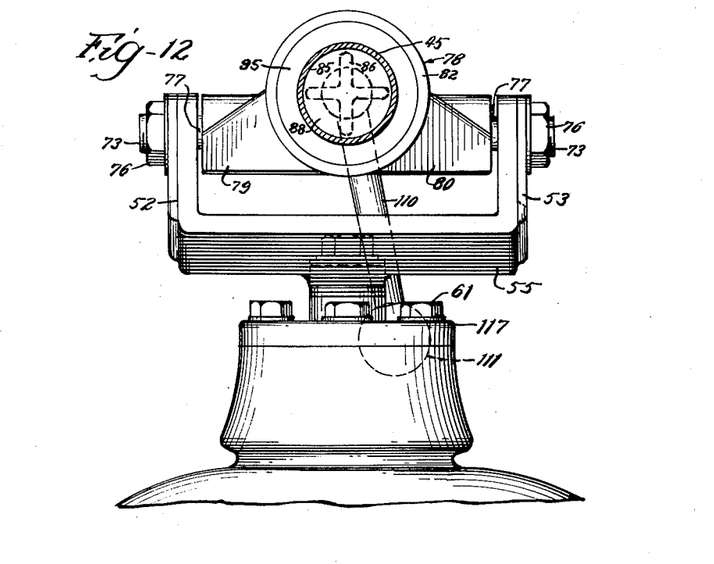
Fig. 12 is a fragmentary sectional view, taken on the plane of the line 12—12 of Fig. 10, looking in the direction of the arrows.

Referring to Figs. 10 and 11, the crank member 87 has a crank arm 110, which extends downwardly and rearwardly, that is, to the right in Fig. 11, and is provided with a ball shaped end 111.

The ball shaped end 111 of crank 110 is mounted in a socket 112 in a bearing member 113, which has the socket 112 of partially spherical shape; that is, the socket 112 is annular, but it extends upwardly past the horizontal axis of the ball 111; and the socket extends downwardly past the horizontal axis of ball 111. In other words, the socket 112 has surfaces surrounding the ball 111 and extending thereon sufficiently to retain the ball 111 in the socket 112 of bearing 113.

Bearing 113 is mounted in a tubular bore 114 having a threaded lower portion 115 for receiving a threaded cap plug 116. The bore 114 is located in an outwardly projecting arm 117 on the plate 59, which is carried by the rotating insulator 60.

At its upper end bore 114 has an inwardly extending flange 118 retaining the bearing 113. Bearing 113 is held against flange 118 by screw cap 116, thus mounting the ball 111 in the socket 112 of arm 117 for universal motion, but without permitting any sliding motion other than the sliding of the ball in a rotative direction in its socket 112.

Figure 9:
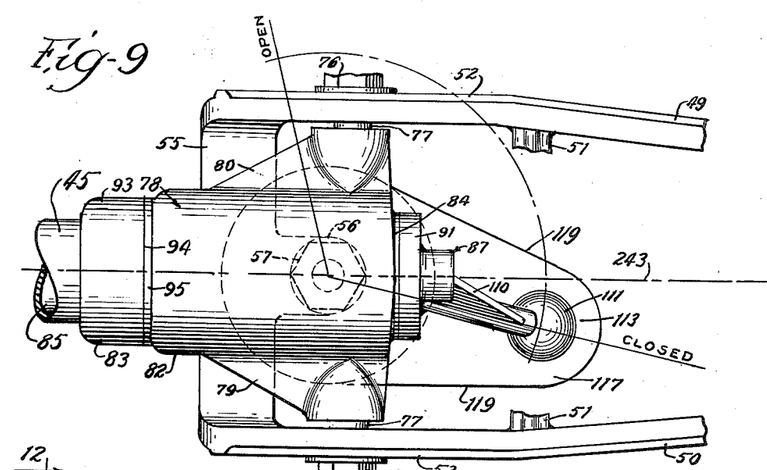
Fig. 9 is a fragmentary top plan view of the blade actuating mechanism shown in the closed position on a larger scale.

Thus in Fig. 10 ball 111 is mounted for universal motion in a socket carried by a horizontal arm 117, which is provided with tapered edges 119 (Fig. 9). In other embodiments of the invention the socket for the ball 111 may be tilted downwardly, as shown in Fig. 1 at the socket member 120. The socket member 120 is shown in greater detail in Fig. 8, where the crank arm 110 is provided with a reduced shank 121 carrying a partially spherical ball member 122, the flat end 123 of which engages a steel ball 124.

The enlargement or socket member 120 on the arm 117 in this case has a cylindrical bore 124 receiving the shank 121 and partial ball 122; and the bore 124 has sufficient clearance around the shank 121 to permit the universal movement between the partial ball 122 and the cylindrical bore 124.

Shank 122 preferably carries a bearing cover 125 having an aperture for receiving the shank 121, where it is frictionally held, and having a depending curved flange 126 of sufficient diameter to have a clearance with the outside of the socket member 120.

Thus the bearing cover prevents the ingress of water or other foreign material into the bore 124; but it does not interfere with rotation or universal motion between socket member 120 and partial ball 122; and no special provision need be made for retaining the ball 122 in the bore 124 when the proportions of the parts and the locations of the axes are substantially as described herein.

Figure 4:
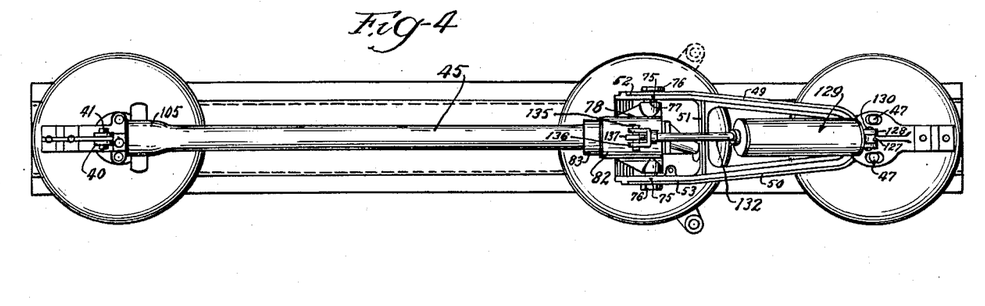
Fig. 4 is a top plan view of the switch of Fig. 3.

Referring to Figs. 3 and 4, these show a modification having a plurality of insulators for higher voltages and having a spring counter-balance arrangement for the switch blade 45.

In this case the bridge plate 48 is provided with an upwardly extending pivot flange 127 fitting between a pair of pivot flanges 128 on a cylinder 129. The pivot flanges 127, 128 are pivotally joined by means of a pintle 130, which may be a rivet or a screw bolt; and the cylinder 129 contains a plunger rod 132, which is slidably mounted in a bore in the end wall 133 of the cylinder.

A helical spring 134 is compressed between the end wall 133 and the plunger 131 when the switch is closed; and the end of the plunger rod 132 is pivotally mounted at 135 by means of a suitable stirrup 136 on a pivot flange 137 carried by the blade housing 78.

Thus the compressed spring 134 tends to lift the blade 45 and to support a portion of its weight, also tending to open the switch, except for the fact that the switch is locked in closed position by its actuating mechanism.

The axes of the various bearings for the present switch bear a definite relation to each other, which is illustrated in the diagram of Figs. 14–17.

In the Hollander switch covered by said prior application, over which this is an improvement, the axis on which the blade rotates, which is the axis 273 in that case, is located below the axis of the trunnions on the blade housing, which is the axis 271.

Figure 14:
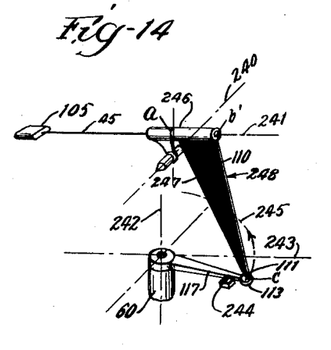
Fig. 14 is a diagrammatic line sketch showing the position of the parts when the switch is in closed position.

In this application the axis of the trunnions, indicated at 240 in Fig. 14, is located below the axis 241 about which the blade itself rotates. In other words, the trunnion axis 240 is located between the axis 241 and the end of the rotating insulator 60.

In the Hollander application the axis 271 of the trunnions is located rearwardly, that is, toward the cranks, of the axis 272 of the rotating insulator, as can be seen in Fig. 10.

According to the present invention, the axis 242 of the rotating insulator is again located forwardly of the axis 240 of the trunnions. The main change, therefore, is the location of the trunnion axis 240 between the rotating insulator and the blade axis 241.

The operation of the switch is as follows:

In Fig. 14 the switch blade, as defined by its axis 241 and wide contact 105, is in closed position. The rotating insulator having crank 117 is located past dead center, as defined by a plane 243 (Fig. 9), which passes through the axis 241 of the blade and the axis 242 of the rotating insulator.

Being past dead center, the crank 117 can move no farther in a clockwise direction in Fig. 14, where it engages a suitable stop 244.

In order to unlock the switch, the crank arm 117 of the rotating insulator 60 must be moved in a counterclockwise direction along the arc 245 until it passes through the dead center plane 243. This it has done in Fig. 15 in the initial motion of the rotating insulator 60 and insulator crank 117 past the plane 243.

This initial rotative motion of the insulator rotates the contact 105 from the horizontal spreading position to the diagonal position of Fig. 15 and relieves the pressure on the contact.

The crank 110 on the rear end of the blade is of constant length; and the length of the blade 45, which projects rearwardly of the trunnion axis 240 is indicated at 246.

The line 247 extending from the center of the ball 111 to point "a" on the blade axis 241 defines one leg of triangle 248, which is shown in black in each of the diagrams. The dimensions of this triangle do not change, as the switch is actuated, because its sides are constant in length. The fixed length 246 of the upper side of the triangle is free to revolve about the center line 240 of the trunnions, but must always fall in the plane of the center line 241 of the switch.

The sides 247 and 110 of the triangle must always connect to the line 246, which is the other side of the triangle in the plane of the axis 241. The point 111 describes the arc 245 of the blade end crank 110.

When the rotating crank 117 rotates from the position shown in Fig. 14 to the position shown in Fig. 15, the blade 45 revolves about its longitudinal axis. This relieves the high pressure and disengages the blade tip contacts.

Figure 16:
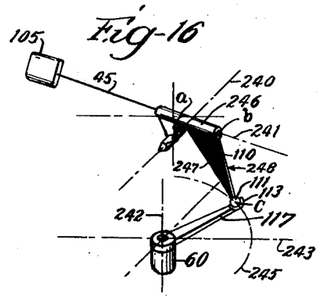
Fig. 16 is a similar diagrammatic sketch showing how further movement of the rotating insulator tends to lift the blade end from the fixed contact.

Thereafter the rotating insulator crank 117 rotates to the position shown in Fig. 16. Since the sides 247 and 110 of the triangle are constant length lines, the points $a$ and $b$ of the triangle must seek locations where the distance from $c$ to their new locations is the same length as the distances $a\,c$ and $b\,c$ of Figs. 14 and 15. The line $a\,b$ or 246 has already been defined as a fixed length line and only capable of motion by revolving about the center line 240 of the trunnions in the plane of the center line 241 of the switch.

The point $b$ then must rotate about the center of trunnions 240 until it reaches a lower elevation than that of Fig. 14 as shown in Fig. 16, to retain its fixed length. This raises the blade tip out of the jaw of the switch.

Figure 17:
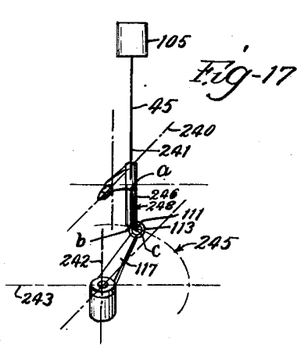
Fig. 17 is a similar diagrammatic sketch showing the position of the parts when the blade has reached a vertical position.

Referring to Fig. 17, the rotation of the insulator crank 117 has been continued along the arc 245 until the mechanism is in completely open position, which is the position assumed when the blade 45 is substantially vertical. The position of the point $b$ of the triangle in the completely open position is at its lowest elevation.

The lines $b\,c$ and $a\,c$ in the completely open position (Fig. 17) are equal to the lines $b\,c$ and $a\,c$ in Figs. 14, 15, and 16, when they are projected to their true lengths. The triangles 248 seen in the four figures are of the same size and shape except that the views are taken at different angles.

It is thus evident that with the arrangement of the parts as described the blade crank 110, corresponding to the line $b\,c$, may be of constant length. This is accomplished by the following requirements:

A—The blade center line 241 must be above the center line 240 of the trunnions.

B—The ball and socket at the point $c$ does not allow of any sliding movement of the ball in its socket except that involved by rotation of the ball in the socket.

C—The rotating insulator crank 117 may be a straight or radial crank instead of a diagonal one.

D—In some embodiments of the invention the crank 117 may also extend diagonally, as shown in Fig. 1.

E—With the parts so arranged no cam and follower are required to start the blade back to closed position from the vertical position of Fig. 17.

In the open position the crank 117 has not passed the dead center plane; and therefore the switch is not locked in open position and will start toward closed position as soon as the crank 117 is rotated in the opposite direction.

The closing operation is the same except that the parts move in the opposite direction.

It will thus be observed that we have invented an improved construction for air break switches of the class described in which the blade crank may be of constant length and sliding movement between the ball and socket is eliminated.

The present switch is adapted to operate more smoothly and positively; and the cam and follower, which might otherwise be required for starting the movement of the blade toward its closed position, may be eliminated. A lesser number of parts is required; and a more satisfactory operation of the switch is thus assured.

Figure 18:
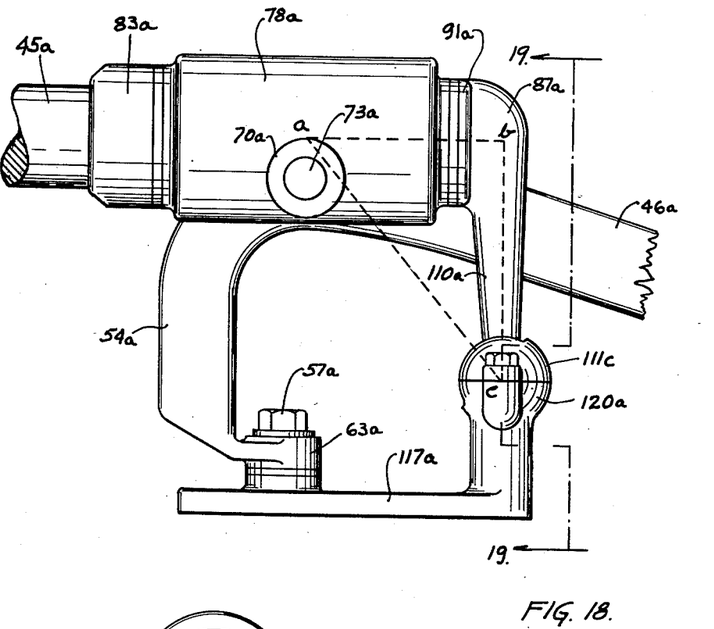
Fig. 18 is a fragmentary side elevational view showing a crank arrangement in which the crank extends radially instead of diagonally.
Figure 19:
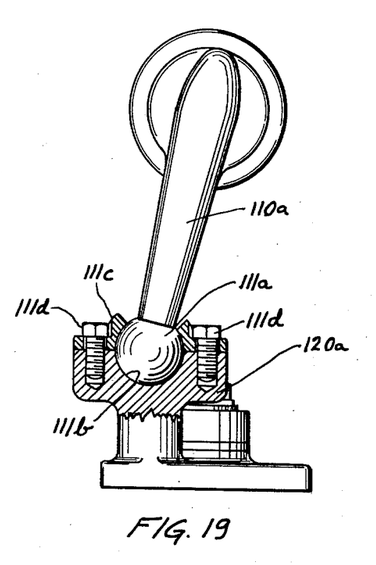
Fig. 19 is a fragmentary end elevational view taken on the plane of the line 19—19 of Fig. 18, looking in the direction of the arrows.

Referring to Figs. 18 and 19, these are fragmentary views showing a modification which meets all of the foregoing requirements A to E and has the crank arm extending laterally instead of diagonally.

In this modification the bridge is located again at 46a. It has a portion 54a supporting the bearing 63a for the bolt 57a on the rotating insulator which carries the plate 117a.

Plate 117a has a laterally extending arm which is turned upwardly and carries the ball socket member 120a. Ball socket member 120a includes a half spherical socket 111b and a cover plate 111c which is partially spherical and has an opening to provide a clearance around the crank 110a.

Cover plate 111c is secured by screw bolts 111d, thus providing a socket which permits no sliding movement at the ball 111a other than that involved in the universal motion.

The blade housing 78a supports the switch blade 45a which is confined against axial movement by the thrust bearings 83a and 91a. The blade housing 70a has its trunnions 73a located below the axis of blade 45a and rearwardly of the rotating insulator axis which passes through the center of bearing 63a.

Blade 45a carries the crank 87a which has a straight radial crank arm 110a carrying the ball 111a. Such a straight radial crank operates in exactly the same manner as the preceding modifications. The length of the radial crank 110a is the same as the distance between points B and C in the diagram of Figs. 14 to 17.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. An improved combination of machine elements comprising a support, a pair of rotatable members, each being rotatably mounted on said support and each having a crank rigidly mounted thereon, the cranks extending toward each other, the first of said rotatable members being also pivotally mounted on said support, said rotatable members rotating on a first axis and a second axis respectively which intersect each other and the axis of said pivotal mounting being located below the first axis and rearwardly of the second axis, and a universal connection between said cranks, the second of said rotatable members actuating the first of said members through said cranks and causing the first of said rotatable members to rotate, and thereafter to pivot in an arcuate direction through an arcuate movement of substantially 90 degrees, the cranks passing the dead-center plane at one end of the pivotal movement to lock the first of said members at one end of its pivotal movement.

2. An improved combination of machine elements comprising a support, a pair of rotatable members each being rotatably mounted on said support and each having a crank rigidly mounted thereon, the cranks extending toward each other, the first of said rotatable members being also pivotally mounted on said support, said rotatable members rotating on a first axis and a second axis respectively which intersect each other and the axis of said pivotal mounting being located below the first axis and rearwardly of the second axis, and a universal connection between said cranks, the second of said rotatable members actuating the first of said members through said cranks and causing the first of said rotatable members to rotate, and thereafter to pivot in an arcuate direction through an arcuate movement of substantially 90 degrees, the cranks passing the dead-center plane at one end of the pivotal movement to lock the first of said members at one end of its pivotal movement, the said cranks both being of constant length and the universal connection between said cranks being arranged to eliminate sliding movement except in a universal manner.

3. An improved combination of machine elements comprising a support, a pair of rotatable members each being rotatably mounted on said support and each having a crank rigidly mounted thereon, the cranks extending toward each other, the first of said rotatable members being also pivotally mounted on said support, said rotatable members rotating on a first axis and a second axis respectively which intersect each other and the axis of said pivotal mounting being located below the first axis and rearwardly of the second axis, and a universal connection between said cranks, the second of said rotatable members actuating the first of said members through said cranks and causing the first of said rotatable members to rotate, and thereafter to pivot in an arcuate direction through an arcuate movement of substantially 90 degrees, the cranks passing the dead-center plane at one end of the pivotal movement to lock the first of said members at one end of its pivotal movement, the said cranks both being of constant length and the universal connection between said cranks being arranged to eliminate sliding movement except in a universal manner, the said first member being held in a second position without passing the dead-center plane whereby said first member may be started in its pivotal movement backward by merely actuating said second rotatable member.

4. An improved combination of machine elements comprising a support, a pair of rotatable members each being rotatably mounted on said support and each having a crank rigidly mounted thereon, the cranks extending toward each other, the first of said rotatable members being also pivotally mounted on said support, said rotatable members rotating on a first axis and a second axis respectively which intersect each other and the axis of said pivotal mounting being located below the first axis and rearwardly of the second axis, and a universal connection between said cranks, the second of said rotatable members actuating the first of said members through said cranks and causing the first of said rotatable members to rotate, and thereafter to pivot in an arcuate direction through an arcuate movement of substantially 90 degrees, the cranks passing the dead-center plane at one end of the pivotal movement to lock the first of said members at one end of its pivotal movement, the said cranks both being of constant length and the universal connection between said cranks being arranged to eliminate sliding movement except in a universal manner, the said first member being held in a second position without passing the dead-center plane whereby said first member may be started in its pivotal movement backward by merely actuating said second rotatable member, the said universal connection comprising a member having a ball shaped surface and a second member having a complementary socket to receive the first member having the ball shaped surface.

5. An improved combination of machine elements comprising a support, a pair of rotatable members each being rotatably mounted on said support and each having a crank rigidly mounted thereon, the cranks extending toward each other, the first of said rotatable members being also pivotally mounted on said support, said rotatable members rotating on a first axis and a second axis respectively which intersect each other and the axis of said pivotal mounting being located below the first axis and rearwardly of the second axis, and a universal connection between said cranks, the second of said rotatable members actuating the first of said members through said cranks and causing the first of said rotatable members to rotate, and therafter to pivot in an arcuate direction through an arcuate movement of substantially 90 degrees, the cranks passing the dead-center plane at one end of the pivotal movement to lock the first of said members at one end of its pivotal movement, the said cranks both being of constant length and the universal connection between said cranks being arranged to eliminate sliding movement except in a universal manner, the said first member being held in a second position without passing the dead-center plane whereby said first member may be started in its pivotal movement backward by merely actuating said second rotatable member, the said universal connection comprising a partial ball shaped member on the end of one crank and a socket having a cylindrical bore and receiving said ball shaped member located on the other crank.

6. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement.

7. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, the axis of rotation of said rotatable switch blade being located above the axis of pivotal mounting of said bearing and the axis of rotation of said insulator being located in front of the axis of said pivotal mounting.

8. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, the axis of rotation of said rotatable switch blade being located above the axis of pivotal mounting of said bearing and the axis of rotation of said insulator being located in front of the axis of said pivotal mounting, the crank carried by said insulator being provided with a socket member on its end which is open toward the crank carried by said blade and the crank on said blade having its end engaged in said socket.

9. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, the axis of rotation of said rotatable switch blade being located above the axis of pivotal mounting of said bearing and the axis of rotation of said insulator being located in front of the axis of said pivotal mounting, the crank carried by said insulator being provided with a socket member at its end which is open toward the crank carried by said blade and the crank on said blade having its end engaged in said socket, said socket being provided with a bearing member secured therein and open to receive a ball shaped member, and a ball shaped member carried by the end of the other crank and engaged in said bearing for universal movement.

10. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, the axis of rotation of said rotatable switch blade being located above the axis of pivotal mounting of said bearing and the axis of rotation of said insulator being located in front of the axis of said pivotal mounting, the crank carried by said insulator being provided with a socket member at its end which is open toward the crank carried by said blade and the crank on said blade having its end engaged in said socket, said socket having a cylindrical bore for receiving the end of said other crank and said other crank having a partially spherical member universally mounted in said bore.

11. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, the axes of rotation of said rotatable switch blade being located above the axis of pivotal mounting of said bearing and the axis of rotation of said insulator being located in front of the axis of said pivotal mounting, the crank carried by said insulator being provided with a socket member of its end which is open toward the crank carried by said blade and the crank on said blade having its end engaged in said socket, said socket having a cylindrical bore for receiving the end of said other crank and said other crank having a partially spherical member universally mounted in said socket, said socket also having a hardened metal ball located in the bottom of said socket and engaging the end of said crank in said socket.

12. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, the axis of rotation of said rotatable switch blade being located above the axis of pivotal mounting, the crank carried by said insulator being provided with a socket member of its end which is open toward the crank carried by said blade and the crank on said blade having its end engaged in said socket, said other crank having a partially spherical member universally mounted in said socket, said socket also having a partially spherical member universally mounted in said socket, said socket also having a hardened metal ball located in the bottom of said socket and engaging the end of said crank in said socket, the said crank in said socket having a reduced end provided with a fixed cap carried thereby and over-lying the end of said socket with a clearance to permit universal movement.

13. An improved combination of machine elements comprising a support, a pair of rotatable members each being rotatably mounted on said support and each having a crank rigidly mounted thereon, the cranks extending toward each other, the first of said rotatable members being also pivotally mounted on said support, said rotatable members rotating on a first axis and a second axis respectively which intersect each other and the axis of said pivotal mounting being located below the first axis and rearwardly of the second axis, and a universal connection between said cranks, the second of said rotatable members actuating the first of said members through said cranks and causing the first of said rotatable members to rotate, and thereafter to pivot in an arcuate direction through an arcuate movement of substantially 90 degrees; the cranks passing the dead-center plane at one end of the pivotal movement to lock the first of said members at one end of its pivotal movement, the effective length of said cranks from the first axis to the center of universal connection, and from the second axis to said center, and the distance from the axis of pivotal mounting to said center, all being constant.

14. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, said universal connection comprising a ball mounted on one crank and a socket for said ball mounted on the other crank, the said socket extending over more than half of the periphery of said ball so that said ball cannot separate from said socket.

15. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, said universal connection comprising a ball mounted on one crank and a socket for said ball mounted on the other crank, the said socket extending over more than half of the periphery of said ball so that said ball cannot separate from said socket, and the said socket comprising a half socket member provided with a pair of threaded bores and a complementary part socket member having a central opening for the crank and having a pair of apertures for screw bolts, the said part socket member being bolted to the half socket member to form a continuous ball socket over the larger portion of said ball.

16. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, said crank comprising a rigid member extending at substantially right angles to the blade axis and the other of said cranks extending substantially at right angles to the insulator axis.

17. An electrical switch mechanism comprising a support, a rotating insulator carried by said support, a fixed contact carried by said support, a rotatable switch blade mounted in a bearing, said bearing being pivotally mounted on said support for arcuate movement of the blade, a crank rigidly mounted on the end of said blade, a crank rigidly mounted on said rotating insulator, said cranks being of fixed length, and a universal connection between said cranks, said cranks moving past dead-center plane which is determined by the axes of the rotating insulator and of said blade, to lock the blade in one of its limiting positions at the end of its arcuate movement, said crank comprising a rigid member extending at substantially right angles to the blade axes and the other of said cranks extending substantially at right angles to the insulator axis, said latter crank having an upward extension provided with a ball socket for receiving a ball carried by the blade crank.

18. An improved combination of machine elements comprising a support, a pair of rotatable members, each being rotatably mounted on said support, and each having a crank rigidly mounted thereon, the cranks extending toward each other, the first of said rotatable members being also pivotally mounted on said support, the first of said rotatable members being a switch blade having a widened end contact for engaging tightly between fixed contacts and the second of said rotatable members being a rotatable insulator, said rotatable members rotating on a first axis and a second axis respectively, which intersect each other and the axis of said pivotal mounting being located to accommodate cranks of constant length and rearwardly of the second axis, and a universal connection between said cranks, the second of said rotatable members actuating the first of said members through said cranks and causing the first of said rotatable members to rotate to relieve contact pressure at said widened end, and thereafter to pivot in an arcuate direction through an arcuate movement of substantially 90 degrees, to lift said switch blade out of contact engagement, the cranks passing dead-center plane at one end of the pivotal movement to lock the first of said members at one end of its pivotal movement.

References Cited in the file of this patent

UNITED STATES PATENTS 2,745,919   Hollander ---------- May 15, 1956